(12) United States Patent
Stegmaier et al.

(10) Patent No.: US 8,789,370 B2
(45) Date of Patent: Jul. 29, 2014

(54) DEVICE FOR SUPPORTING A SUPERCHARGING DEVICE

(75) Inventors: Juergen Stegmaier, Ludwigsburg (DE);
Martin Cichon, Stuttgart (DE);
Manfred Schmitt, Heppenheim (DE);
Bernd Banzhaf, Stuttgart (DE); Achim Schmidt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 13/377,247

(22) PCT Filed: Jun. 22, 2010

(86) PCT No.: PCT/EP2010/058777
§ 371 (c)(1),
(2), (4) Date: Feb. 27, 2012

(87) PCT Pub. No.: WO2011/018264
PCT Pub. Date: Feb. 17, 2011

(65) Prior Publication Data
US 2012/0144825 A1 Jun. 14, 2012

(30) Foreign Application Priority Data
Aug. 12, 2009 (DE) .......................... 10 2009 028 469

(51) Int. Cl.
*F02M 25/07* (2006.01)
*F02B 33/44* (2006.01)
*F02G 3/00* (2006.01)
*F01K 23/10* (2006.01)
*F02B 37/013* (2006.01)
*F02G 5/02* (2006.01)
*F02M 37/18* (2006.01)

(52) U.S. Cl.
CPC .......... *F02M 25/0707* (2013.01); *F02B 37/013* (2013.01); *F02G 5/02* (2013.01); *F02M 37/18* (2013.01); Y02T 10/144 (2013.01); Y02T 10/16 (2013.01)
USPC ................ 60/605.2; 60/612; 60/616; 60/618; 123/562

(58) Field of Classification Search
CPC ...... F02B 37/00; F02B 37/013; F02B 37/004; F02B 37/18; F02M 25/07; F02M 25/0715; F02M 25/0711; F02G 5/02; F01K 23/065; Y02T 10/144; Y02T 10/16; F01N 5/02
USPC ............. 60/597–598, 605.1–605.2, 604, 612, 60/618, 607, 616; 123/562
See application file for complete search history.

(56) References Cited

U.S. PATENT DOCUMENTS 3,306,032 A * 2/1967 Chaffotte ........................ 60/599
5,259,196 A * 11/1993 Faulkner et al. ................. 60/599

(Continued)

FOREIGN PATENT DOCUMENTS

DE 28 38 490 2/1980
DE 10 2006 057247 6/2008

(Continued)

OTHER PUBLICATIONS

BMW-Vierzylinder nutzt Abwaerme fuer Leistungssteigerung—Motor mit Turbine; Auto Motor Und Sport, SCW Media Vertriebs GmbM, Stuttgart, DE, No. 26, Jan. 1, 2005; p. 10.

*Primary Examiner* — Thai Ba Trieu
*Assistant Examiner* — Ngoc T Nguyen
(74) *Attorney, Agent, or Firm* — Kenyon & Kenyon LLP

(57) ABSTRACT

A device for utilizing the waste heat of an internal combustion includes a single-stage or multi-stage supercharging device, which is designed as an exhaust-gas turbocharger in particular. The single-stage or multi-stage supercharging device is assigned an additional supercharging device including an expansion machine acted upon by an auxiliary circuit, in particular a steam circuit.

11 Claims, 1 Drawing Sheet

(56) References Cited

U.S. PATENT DOCUMENTS

| | | |
|---|---|---|
| 6,378,308 B1 | 4/2002 | Pfluger |
| 7,490,462 B2 * | 2/2009 | Roozenboom et al. ......... 60/612 |
| 2003/0005696 A1 | 1/2003 | Wilson |
| 2007/0277514 A1 | 12/2007 | Kammel |
| 2008/0034752 A1 * | 2/2008 | Becker et al. .................. 60/612 |
| 2008/0092539 A1 * | 4/2008 | Marshall et al. ............... 60/599 |
| 2010/0192569 A1 * | 8/2010 | Ambros et al. ............. 60/605.2 |
| 2011/0209473 A1 * | 9/2011 | Fritz et al. .................... 60/605.2 |

FOREIGN PATENT DOCUMENTS

| | | | |
|---|---|---|---|
| JP | 06033707 A | * | 2/1994 |
| WO | WO 2007/014942 | | 2/2007 |

\* cited by examiner

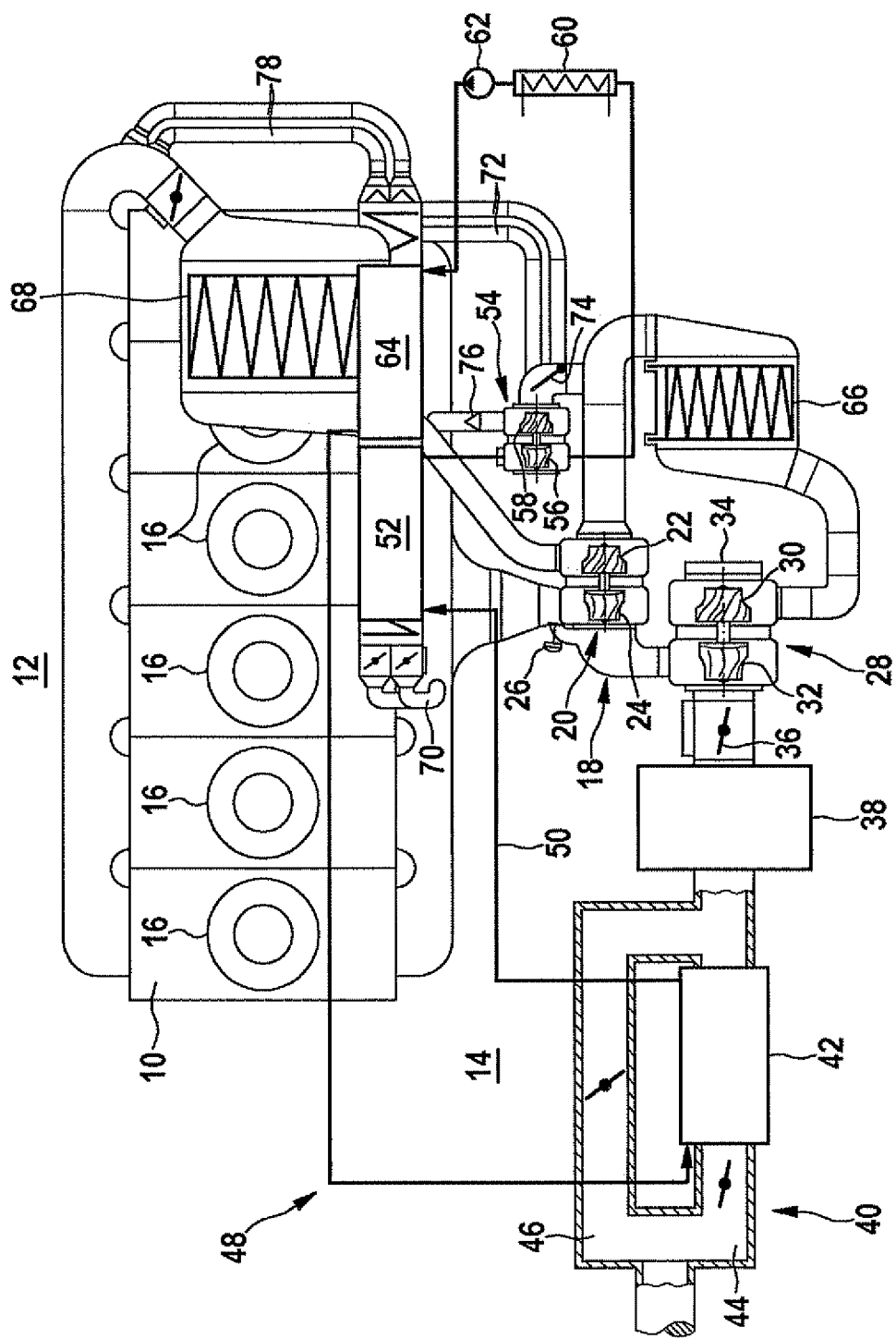

DEVICE FOR SUPPORTING A SUPERCHARGING DEVICE

BACKGROUND INFORMATION

German Patent Application No. DE 10 2006 057 247 relates to a supercharging device in which thermal energy is extracted from the exhaust gas of an internal combustion engine via a steam circuit and is partially converted into mechanical and electrical energy via a turbine. Unused waste heat is dissipated into the environment via a separate condenser. A supercharging device is used in particular to charge an internal combustion engine. At least one exhaust-gas heat exchanger of a circuit for a working medium is located in an exhaust system. Upstream from the at least one exhaust gas heat exchanger is a supply unit in the circuit of the working medium. The working medium circuit contains at least one expansion machine via which at least one compressor part situated in the intake system of the internal combustion engine is driven.

An article entitled "BMW four-cylinder engine uses waste heat to increase performance—engine with turbine" is known from the magazine "Auto, Motor and Sport", volume 10, page 26/2005. According to this publication, an internal combustion engine converts approximately two-thirds of the energy in the fuel into waste heat that is either absorbed by the cooling system of the internal combustion engine or is removed via the exhaust system of the internal combustion engine. The previously unused waste heat may be used to increase efficiency by up to 15% in internal combustion engines. For this purpose, a 1.8-liter four-cylinder engine is coupled to a two-stage steam turbine which acts on the crankshaft of the 1.8-liter four-cylinder engine. Hot steam is generated by heat exchangers in the vicinity of the exhaust pipe in the exhaust system of the internal combustion engine. With the aid of a water circuit, cooling fluid may be branched off of the cooling circuit of the internal combustion engine. As a result of the driving of the crankshaft via the two-stage steam turbine, the output and the torque of the internal combustion engine may be increased or the specific fuel consumption may be significantly lowered.

SUMMARY OF THE INVENTION

The approach according to the present invention provides a preferably steam-operated auxiliary circuit situated between the exhaust system and the intake system of an internal combustion engine in which a compressor part of a supercharging device is preferably parallel to or in series with the compressor part of an existing supercharging device, preferably a turbocharger. This approach may be used for both single-stage and two-stage supercharging. In the case of two-stage supercharging via a supercharging device including a low-pressure stage and a high-pressure stage, the additional compressor part acted upon by the auxiliary circuit is connected preferably in parallel to the high-pressure stage of the existing internal combustion engine since the exhaust-gas back pressure of the waste gate typically situated on the high-pressure part may be lowered. As a result, the efficiency may be improved by decreasing the exhaust effort of the internal combustion engine.

The advantage of the concept according to the present invention is that, on the one hand, the output of the existing single-stage or two-stage supercharging device may be increased, it also being possible, on the other hand, to reduce the output of the existing single-stage or two-stage supercharging device by opening the waste gate, for example. An associated reduction of the exhaust-gas back pressure results in an improvement of the efficiency of the internal combustion engine due to a reduction of the exhaust effort.

If the exhaust-gas back pressure is reduced as mentioned above by opening the waste gate of the supercharging device, which is preferably designed as a single-stage or two-stage exhaust-gas turbocharger, less or no exhaust gas may consequently be recirculated to the intake system of the internal combustion engine during exhaust gas recirculation while maintaining the supercharging pressure. To maintain or increase the exhaust-gas recirculation rate, an additional exhaust-gas recirculation line is provided which conducts the exhaust gas to be recirculated into the air path upstream from the compressor part of the additional supercharging device. To set the exhaust-gas recirculation rate, a metering valve may be provided in this additional exhaust-gas recirculation line.

To ensure that no charge air return flow via the compressor part of the additional supercharging device occurs in the case of an inactive auxiliary circuit, which is preferably a steam-operated auxiliary circuit, a check valve may be provided upstream or downstream from the compressor part. A check valve in the air path may also be provided upstream or downstream from the compressor part of the already present single-stage or two-stage supercharging device.

The advantage of the concept according to the present invention is that in contrast to the concept described in German Patent Application No. DE 10 2006 057 247, for example, the engine output is not affected and in particular exhaust-gas recirculation is ensured even when the output of the auxiliary circuit, which is designed as a steam circuit in particular, is reduced, as is the case during the warm-up phase of the internal combustion engine, for example. Exhaust-gas recirculation may still be ensured when the exhaust-gas back pressure on the outlet side is lowered significantly by an open waste gate downstream from a supercharging device.

The advantage of the system according to the present invention compared to a system having one or multiple conventional supercharging devices, e.g., exhaust-gas turbochargers, is that the efficiency of the internal combustion engine may be increased due to the lowering of the exhaust-gas back pressure and/or the exhaust-gas recirculation rate is increased and thus the untreated NOx emissions are reduced via internal engine measures, the emissions being able to be additionally reduced as necessary by an SCR (selective catalytic reduction) unit in the exhaust system using a urea solution or a urea-water solution, thereby resulting in an additional reduction in the absolute NOx emissions.

BRIEF DESCRIPTION OF THE DRAWING

FIG. 1 shows a diagram of the device of the present invention for supporting a supercharging device in internal combustion engines.

DETAILED DESCRIPTION

FIG. 1 shows an internal combustion engine 10 which includes 6 cylinders 16 in this embodiment variant and has an in-line design. However, the concept according to the present invention using a device 48 for utilizing waste heat of an internal combustion engine 10 is not limited to such a 6-cylinder in-line design of internal combustion engine 10, but also includes configurations with 4 cylinders, 8 cylinders, 10 cylinders, or 12 cylinders as well as internal combustion engines 10 including a smaller number of cylinders deviating from the in-line design with a V-shaped or star-shaped design or the like.

An inlet side of the internal combustion engine is identified by reference numeral 12 while an outlet side of internal combustion engine 10 is identified by reference numeral 14.

A supercharging device 18 is assigned to internal combustion engine 10 shown in FIG. 1. In the embodiment variant shown in FIG. 1, supercharging device 18, which is designed as an exhaust-gas turbocharger 18 in particular, includes a high-pressure stage 20 and a low-pressure stage 28. Supercharging device 18 is a two-stage supercharging device. However, supercharging device 18, which is designed in particular as an exhaust-gas turbocharger, may deviate from FIG. 1 and have a single-stage design.

FIG. 1 shows that a high-pressure stage 20 of supercharging device 18 has a high-pressure compressor part 22 and a high-pressure turbine part 24. High-pressure turbine part 24 is assigned an actuator-operated waste gate 26 via which the volume flow of the exhaust gas flowing through high-pressure turbine part 24 and thus the exhaust-gas back pressure prevailing on outlet side 14 of internal combustion engine 10 may be changed.

Moreover, the two-stage supercharging device shown in FIG. 1 includes low-pressure stage 28, which is connected downstream from high-pressure stage 20. Low-pressure stage 28 includes a low-pressure compressor part 30 and a low-pressure turbine part 32. An intake point 34 for fresh air from the environment is located at low-pressure turbine part 32. A valve 36 is located downstream from low-pressure turbine part 32 of two-stage supercharging device 18. The valve, designed as a flap valve, is used to increase the efficiency of the engine brake. Flap valve 36 may be closed during braking operation. As a result, the internal combustion engine must work against a higher exhaust-gas back pressure.

Moreover, an SCR unit 38 is situated in exhaust system 40 of internal combustion engine 10 downstream from valve 36. This SCR unit (SCR—selective catalytic reduction) reduces the NOx components in the exhaust gas of internal combustion engine 10 to form $N_2$ and $H_2O$ by introducing urea or a urea-water solution into the exhaust gas of internal combustion engine 10. SCR unit 38 in the exhaust system of internal combustion engine 40 makes it possible to satisfy the stricter exhaust-gas limits to be expected in the future with respect to a significant reduction of the NOx component in the exhaust gas of the internal combustion engine.

As is also apparent in FIG. 1, an exhaust-gas heat exchanger 42, which is part of an auxiliary circuit 48, is located in exhaust system 40 of internal combustion engine 10. A bypass channel 46, via which the exhaust gas may be directed past heat exchanger 42, is parallel to heat exchanger 42. Auxiliary circuit 48, which is a steam circuit in particular, represents the device according to the present invention for utilizing the waste heat of internal combustion engine 10.

The exhaust-gas flow directed across bypass channel 46 or heat exchanger 42 may be set via the flaps shown in FIG. 1.

Stretching from an exhaust-gas heat exchanger 42, which removes heat from the exhaust gas of the internal combustion engine, is a supply line 50 to a first heat exchanger 52 to which an exhaust-gas recirculation system 70 is assigned. On outlet side 14 of internal combustion engine 10, the exhaust gas expelled from cylinders 16 of internal combustion engine 10 in the exhaust stroke is directed into an exhaust manifold before the exhaust gas enters supercharging device 18, in particular high-pressure turbine part 24 of the two-stage supercharging device shown in FIG. 1, waste gate 26 being assigned to high-pressure turbine part 24. A branch point via which exhaust gas is directed into exhaust-gas recirculation system 70 is located at the exhaust manifold on outlet side 14 of internal combustion engine 10. First heat exchanger 52 which is acted upon by supply line 50 is assigned to the exhaust-gas recirculation system, The working medium of auxiliary circuit 48, which is heated and vaporized in exhaust gas heat exchanger 42, the auxiliary circuit being designed in particular as a steam circuit, is further heated by exhaust-gas heat exchanger 42, on the one hand, and on the other hand directly by the hot exhaust gasses from outlet side 14 of the internal combustion engine in first heat exchanger 52 of exhaust-gas recirculation system 70. The heated or overheated working medium is supplied to turbine part 56 of an auxiliary supercharging device 54, which is designed in particular as an exhaust-gas turbocharger and drives a compressor part 58 on the fresh air side. Turbine part 56 of auxiliary supercharging device 54 representing the expansion machine in auxiliary circuit 48 expands the working medium, i.e., the steam, which is fed to a condenser 60 downstream from the outlet side of expansion machine 56, i.e. the turbine part, in which the working medium is liquefied before it is fed via a pump 62 downstream from condenser 60 to an additional second heat exchanger 64 assigned to exhaust-gas recirculation system 70. The liquid working medium is reheated in this second heat exchanger 64 of exhaust-gas recirculation system 70. For this purpose, additional energy is removed from the recirculated exhaust gas after it exits first heat exchanger 52, thus causing the recirculated exhaust gas to cool further.

On the outlet side, the working medium travels from second heat exchanger 64 of exhaust-gas recirculation system 70 back to the area of exhaust system 40 where it enters exhaust-gas heat exchanger 42 to remove the heat from the exhaust gas in exhaust system 40 or from the exhaust gas flowing in first flow 44 and to further heat and vaporize the working medium.

The fresh air path in device 48 according to the present invention for utilizing the waste heat of an internal combustion engine 10 is as follows. FIG. 1 shows a two-stage supercharging device 18 which includes a high-pressure stage 20 and a low-pressure stage 28. In the embodiment variant according to FIG. 1, waste gate 26, which is operable via a separate actuator, is assigned to high-pressure turbine part 24. Low-pressure turbine part 32 of low-pressure stage 28 is downstream from high-pressure turbine part 24. Via this, low-pressure compressor part 30 is driven and fresh air is drawn in from the environment at intake point 34 and compressed in the intake system of internal combustion engine 10. A first charge-air cooler 66, which is used to remove waste heat from the precompressed fresh air, is located therein downstream from low-pressure compressor part 30. An additional section of the intake line via which precompressed fresh air is supplied to high-pressure compressor part 22 of high-pressure stage 20 is located downstream from first charge-air cooler 66. Compressor part 58 is connected in parallel thereto via auxiliary circuit 48, which is preferably a steam circuit. A check valve 76 is situated downstream from compressor part 58 of auxiliary supercharging device 54, which prevents the return flow of the charge air via compressor part 58 of auxiliary supercharging device 54 in the case of inactive auxiliary circuit 48 so that the charge pressure may be maintained. The fresh air further compressed in high-pressure compressor part 22 and the air precompressed by compressor part 58 of auxiliary supercharging device 54 driven by auxiliary circuit 58 flow to second charge-air cooler 68 provided in the intake line to inlet side 12 of internal combustion engine 10.

As further shown in FIG. 1, a metering valve 74, situated at the outlet of a first additional exhaust-gas recirculation line 72, is located upstream from compressor part 58 of auxiliary supercharging device 54, which is acted upon by auxiliary circuit 48, which is a steam circuit in particular. This additional exhaust-gas recirculation line 72 is used to maintain or increase the exhaust-gas recirculation rate for the exhaust gas to be recirculated and may empty into the air path upstream from the inlet of compressor part 58 of additional supercharging device 54. However, additional exhaust-gas recirculation line 72 is not absolutely necessary. A standard, already-provided exhaust-gas recirculation line 78, which empties into the intake system of internal combustion engine 10 on inlet side 12 downstream from second charge-air cooler 68, is located downstream in relation to the exhaust gas in exhaust-gas recirculation system 70 behind second heat exchanger 64 of the exhaust-gas recirculation system.

The approach according to the present invention makes it possible to lower the exhaust-gas back pressure on outlet side 14 of internal combustion engine 10 in the case of operation of waste gate 26, which is connected in parallel to high-pressure turbine part 24 in the case of the two-stage supercharging device 18 according to FIG. 1, so that the engine efficiency is decreased by reducing the exhaust effort in the exhaust stroke. As a result of lowering the exhaust-gas back pressure on outlet side 14 of internal combustion engine 10, the built-up charge-air pressure may be maintained and less or no exhaust gas is recirculated into the intake system using the approach according to the present invention. To maintain or increase the exhaust-gas recirculation rate, first additional exhaust-gas recirculation line 72 may be provided, metering valve 74 being used to set the exhaust-gas recirculation rate. Using the approach according to the present invention for a device for utilizing the waste heat of internal combustion engine 10 results in the advantage that the output of internal combustion engine 10 and exhaust-gas recirculation are ensured even when the output of auxiliary circuit 48, which is designed as a steam circuit in particular, is reduced as occurs in the warm-up phase of internal combustion engine 10 in particular. Furthermore, the advantage of device 48 according to the present invention for utilizing the waste heat of internal combustion engine 10 is that the efficiency of the internal combustion engine is increased compared to a system having one or more conventional supercharging devices 18 and/or the exhaust-gas recirculation rate is influenceable, thus making it possible to lower the untreated NOx emissions. A reduction of untreated NOx emissions then makes it possible to further lower same via the SCR unit, which is situated in exhaust system 40 of the internal combustion engine and is provided to reduce the NOx emissions into $N_2$ and $H_2O$ by way of a selective catalytic reaction. The smaller the amount of untreated NOx emissions in the exhaust gas fed to SCR unit 38, the greater the reduction of same by introducing urea or a urea-water solution into SCR unit 38 in exhaust system 40.

In another advantageous embodiment variant (not shown) of the concept of the present invention, compressor part 58 of auxiliary supercharging device 54, which is designed as a turbocharger acted upon by a steam circuit in this case, may be connected in series with the compressor part of a single-stage supercharging device or with compressor parts 22, 30 of a two-stage supercharging device 18.

The approach according to the present invention may be used in all vehicles in which supercharged internal combustion engines 10 are used. Internal combustion engines 10 may be gasoline engines, diesel engines, or natural gas-powered engines equipped with a device 48 for utilizing the waste heat from the internal combustion engine.

What is claimed is:

1. A device for utilizing the waste heat of an internal combustion engine, comprising:
a single-stage or multi-stage supercharging device; and
an additional supercharging device including an expansion machine acted upon by an auxiliary circuit, the additional supercharging device being connected to the single-stage or multi-stage supercharging device;
wherein an exhaust-gas recirculation system downstream from a branch point is assigned a first heat exchanger, which removes heat from exhaust gas of the internal combustion engine and adds the heat to steam of the auxiliary circuit upstream from the additional supercharging device.

2. The device according to claim 1, wherein the single-stage or multi-stage supercharging device is an exhaust-gas turbocharger.

3. The device according to claim 1, wherein the auxiliary circuit is a steam circuit.

4. The device according to claim 1, wherein the additional supercharging device is a turbocharger whose compressor part is connected in parallel or in series to at least one compressor part of the single-stage or multi-stage supercharging device.

5. The device according to claim 4, wherein the compressor part of the turbocharger is connected in parallel or in series to a high-pressure compressor part of a high-pressure stage of the multi-stage supercharging device; wherein the multi-stage supercharging device is defined as a two-stage supercharging device.

6. The device according to claim 1, wherein the single-stage or multi-stage supercharging device includes a waste gate for influencing an exhaust-gas back pressure on an outlet side of the internal combustion engine.

7. The device according to claim 1, wherein an exhaust-gas recirculation system is assigned to the internal combustion engine on an outlet side.

8. The device according to claim 1, wherein the auxiliary circuit is assigned a second heat exchanger, which adds heat from recirculated exhaust gas to steam of the auxiliary circuit after flowing through the first heat exchanger.

9. The device according to claim 1, wherein recirculated exhaust gas is fed via a first additional exhaust-gas recirculation line into an air path upstream from a compressor part of the additional supercharging device.

10. The device according to claim 9, wherein a metering valve is situated in the first additional exhaust-gas recirculation line.

11. The device according to claim 9, wherein a check valve is installed upstream or downstream from the compressor part of the additional supercharging device or upstream or downstream from at least one compressor part of the single-stage or multi-stage supercharging device.

* * * * *